United States Patent [19]

Janz et al.

[11] 4,165,898
[45] Aug. 28, 1979

[54] ARM REST WITH RECESSED ASHTRAY, FOR MOTOR VEHICLES, OR THE LIKE

[75] Inventors: Joachim Janz, Wuppertal; Bodo Mentzel, Velbert, both of Fed. Rep. of Germany

[73] Assignee: Gebr. Happich GmbH, Fed. Rep. of Germany

[21] Appl. No.: 842,316

[22] Filed: Oct. 14, 1977

[30] Foreign Application Priority Data

Oct. 22, 1976 [DE] Fed. Rep. of Germany ....... 2647794

[51] Int. Cl.² ............................................. B60N 1/06
[52] U.S. Cl. ................................................... 296/153
[58] Field of Search ..................... 296/153, 37.9, 37.11, 296/37.13; 248/118; 297/412

[56] References Cited

U.S. PATENT DOCUMENTS

| 1,700,122 | 1/1929 | Boer | 296/37.13 |
| 3,620,566 | 11/1971 | Leconte | 296/153 |

*Primary Examiner*—Joseph F. Peters, Jr.
*Assistant Examiner*—Gene A. Church
*Attorney, Agent, or Firm*—Ostrolenk, Faber, Gerb & Soffen

[57] ABSTRACT

An arm rest for a vehicle, including a recess for an ashtray insert; the arm rest is of foamed material and is covered with a skin layer that is secured to the foamed body and that is securely attached to the walls defining the recess for the ashtray insert; a detent or clip is formed in the skin layer at the ashtray insert recess for holding an ashtray insert in the recess.

7 Claims, 2 Drawing Figures

ARM REST WITH RECESSED ASHTRAY, FOR MOTOR VEHICLES, OR THE LIKE

The invention relates to an arm rest, particularly for a motor vehicle. The arm rest is provided with a recessed ashtray.

BACKGROUND OF THE INVENTION

An arm rest comprises an inner padding layer that is surrounded by a prefabricated covering layer or skin layer. The skin layer may be a wound or blown layer. Such arm rests are produced in large quantities for use as original equipment in motor vehicles.

Heretofore, the side and bottom walls that define an ashtray insert recess in the arm rest were not formed of the skin layer. Instead, the skin layer was drawn down along the vertical walls of the ashtray recess only a short distance and were connected with the inner padding layer beneath the skin layer at the time of the manufacture of the arm rest. The side walls of the ashtray recess itself were formed of a second part, usually an injection-molded plastic body, which was inserted into the ashtray recess and which was additionally bonded or welded to the arm rest.

SUMMARY OF THE INVENTION

It is one object of the invention to simplify and reduce the cost of the manufacture of an arm rest, while not diminishing the efficiency of use of known arm rests.

It is another object of the invention to avoid the need for a second part to be inserted into the ashtray recess to serve as the receptacle for a removable ashtray insert.

According to the invention, the prefabricated skin layer of the arm rest is a one piece structural member that embraces the entire generated surface of the arm rest, except for the rear attachment plane of the arm rest by which the arm rest is attached to the interior of a vehicle. The same skin layer also forms the walls and the bottom of the recess for the ashtray insert.

In some older manufacturing methods, ashtray recess walls were included during the manufacture of the arm rest for technical molding reasons. But, these walls were merely excess skin and in undefined and uncertain form. These excess skin layer sections had to be removed.

Manufacture of an arm rest according to the invention is greatly simplified and material is saved. The simplification results because the side walls and the bottom of the recess for the ashtray insert are manufactured along with the outer skin layer for the rest of the arm rest. There is no need for separate structural members for the walls, no need to separately install walls and a skin layer for the walls and no use for a glue connection between different parts of a skin layer. A saving of material results because no insert body is needed for forming the ashtray insert receptacle.

There is another advantage to the completely closed and continuous arm rest covering skin layer according to the invention. Due to its seamless formation, it prevents transfers of foam material from inside the covering skin layer to external regions of the arm rest. As a result, the foaming mold need no longer be provided with mold release agents, or only need sporadically be provided with these agents. Removal of the residues of mold release agents on the finished arm rest is thus unnecessary, and foam transfers will no longer occur.

It is possible to give the recess for the ashtray insert smooth walls and to provide the ashtray insert with clamping or barb means for holding the insert sufficiently firmly in the arm rest recess. An ashtray insert which is constructed to clamp itself in the ashtray recess is more difficult to manufacture than a plain ashtray insert, especially because the insert is comprised almost exclusively of metal, and the special attachment means on the insert must be taken into account in design and manufacture of the insert.

It appears to be better, therefore, for the skin layer at the ashtray insert recess to be equipped with detent and/or clip means in one piece and of uniform material for the temporary fixation of the ashtray insert. These additional detent and/or clip means do not cause more work in manufacture of the arm rest.

BRIEF DESCRIPTION OF THE DRAWINGS

Other objects and features of the invention will be understood from the following description of the accompanying drawings.

DESCRIPTION OF A PREFERRED EMBODIMENT

Figure 1:
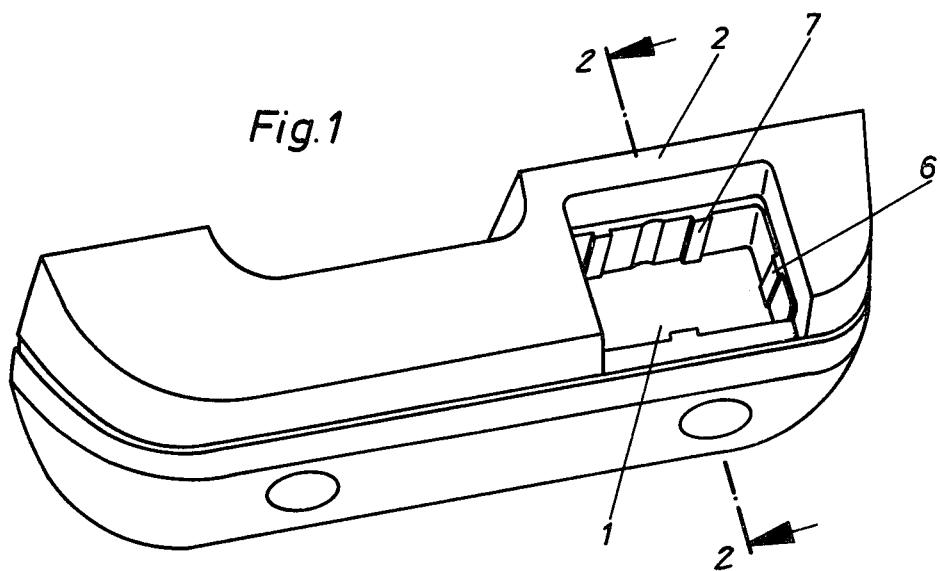
FIG. 1 is a perspective view of an arm rest that is provided with a recess for an ashtray insert.

The arm rest has a conventional configuration with a through grip for the hand and with a recess 1 for an ashtray insert. In a known manner, the arm rest is externally entirely surrounded by a skin layer 2, which is comprised of an elastic, usually plastic material. As can be seen from FIG. 2, the skin layer 2 is continuous, except for the discontinuity around hole 5, and is smoothly shaped also in the region of the ashtray insert recess 1. The skin layer is shaped not only to provide the uninterrupted formation of all of the walls of the ashtray insert recess 1, including the bottom wall of the receptacle, but also to form in the recess 1 the guide tracks 6 and detent means 7 projecting from the wall for secure holding of a removable ashtray insert (not shown) and for the temporary fastening of this insert against unintended release, especially during use of the ashtray, for example, when opening the ashtray cover.

Figure 2:
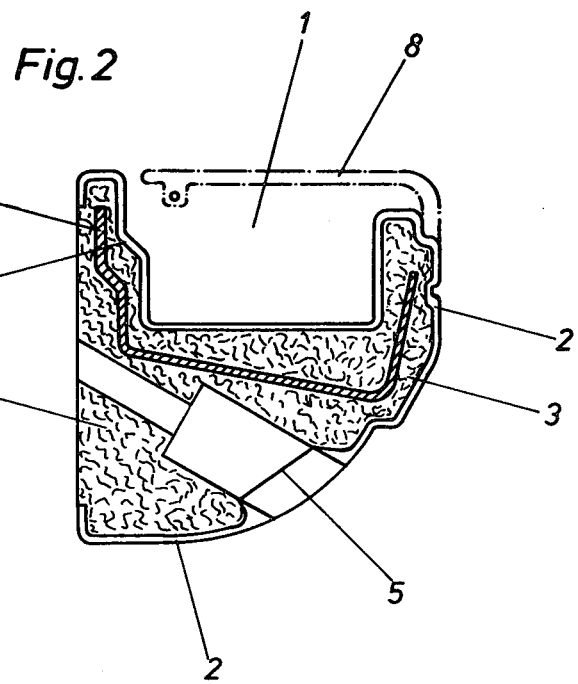
FIG. 2 is a schematic cross-sectional view of the arm rest along line A-A in FIG. 1.

In FIG. 2, an ashtray cover 8 is shown in dash-dot lines. Cover 8 may be fastened to the removable ashtray insert or to the ashtray insert recess 1. In the latter case, the skin layer 2 would have additional formations, such as the guide tracks 6 or the detent means 7, for also holding cover 8.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Arm rest for a vehicle, or the like: said arm rest including a recess for receiving an ashtray insert; said recess including and being defined by side walls and by a bottom wall; said arm rest including also a manually engageable recess;

said arm rest being defined in shape by an inner padding layer;

an outer flexible skin layer over said padding layer; said outer flexible skin securely embracing the entire surface of said arm rest and its said padding layer, including the surface of said manually engageable recess and also forming the surface of and defining the side walls and said bottom wall of said recess for receiving said ashtray.

2. The arm rest of claim 1, wherein said arm rest includes a rear attachment plane, and said skin not contacting said attachment plane.

3. The arm rest of claim 1, wherein said skin is all of one piece.

4. The arm rest of claim 1, wherein in the vicinity of said recess, said skin being provided with retaining means for retaining in said recess an ashtray insert.

5. The arm rest of claim 4, wherein said retaining means is of one piece with and of the same material as said skin.

6. The arm rest of claim 4, wherein said retaining means comprise detent means defined in said recess.

7. The arm rest of claim 6, wherein said retaining means is of one piece with and of the same material as said skin; said skin being all of one piece.

* * * * *